(12) United States Patent
Seets et al.

(10) Patent No.: US 8,734,894 B2
(45) Date of Patent: May 27, 2014

(54) SELF-ALIGNED BEVELS FOR WRITE POLES

(75) Inventors: David Chris Seets, Shorewood, MN (US); Chang Xie, Rosemount, MN (US); Christopher J. Cote, Eden Prairie, MN (US); Karen Virginia Rud, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 1049 days.

(21) Appl. No.: 12/777,978

(22) Filed: May 11, 2010

(65) Prior Publication Data

US 2011/0281023 A1    Nov. 17, 2011

(51) Int. Cl.
G11B 5/127 (2006.01)
G11B 5/147 (2006.01)
G11B 5/265 (2006.01)

(52) U.S. Cl.
USPC ....... 427/123; 427/58; 427/126.1; 427/126.3; 427/126.4; 427/127; 427/128; 427/131; 427/132; 427/256; 427/258; 427/259; 427/261; 427/264; 427/271; 427/272; 427/282; 360/125.01; 360/125.02; 360/125.03; 360/125.14; 360/125.15

(58) Field of Classification Search
None
See application file for complete search history.

(56) References Cited

U.S. PATENT DOCUMENTS

| | | | |
|---|---|---|---|
| 7,006,326 B2 | 2/2006 | Okada et al. | |
| 7,159,302 B2 | 1/2007 | Feldbaum et al. | |
| 7,251,878 B2 | 8/2007 | Le et al. | |
| 7,477,481 B2 | 1/2009 | Guthrie et al. | |
| 7,506,428 B2 | 3/2009 | Bedell et al. | |
| 7,532,433 B2 | 5/2009 | Kawato et al. | |
| 7,716,813 B2 | 5/2010 | Lee et al. | |
| 7,777,988 B2 | 8/2010 | Guan et al. | |
| 7,924,528 B2 | 4/2011 | Sasaki et al. | |
| 8,107,193 B2 | 1/2012 | Nunokawa et al. | |
| 8,169,740 B2 | 5/2012 | Sasaki et al. | |
| 8,233,233 B1 | 7/2012 | Shen et al. | |
| 8,233,234 B2 | 7/2012 | Hsiao et al. | |
| 8,243,386 B2 | 8/2012 | Kameda et al. | |
| 8,264,792 B2 | 9/2012 | Bai et al. | |
| 8,277,669 B1 | 10/2012 | Chen et al. | |
| 8,379,347 B2 | 2/2013 | Guan et al. | |
| 8,381,392 B2 | 2/2013 | Zou et al. | |
| 2002/0097540 A1* | 7/2002 | Hayashi et al. | 360/324.12 |
| 2002/0170165 A1* | 11/2002 | Plumer et al. | 29/603.14 |
| 2004/0095691 A1* | 5/2004 | Lin et al. | 360/324.1 |

(Continued)

OTHER PUBLICATIONS

Office Action from the United States Patent and Trademark Office dated Apr. 4, 2012 for corresponding U.S. Appl. No. 12/777,959, filed May 11, 2010.

*Primary Examiner* — Michael Cleveland
*Assistant Examiner* — Lisha Jiang
(74) *Attorney, Agent, or Firm* — Westman, Champlin & Koehler, P.A.

(57) ABSTRACT

A method of depositing material onto a base portion of a wafer is disclosed. The method includes forming a bevel into a portion of a surface of the base portion of the wafer and depositing a first layer of conductive material onto the beveled portion of the base portion so that part of the first layer includes a wedge shape above the surface of the base portion. A second layer of conductive material is deposited onto the base portion including the portion of the base portion onto which the first layer of material is deposited.

17 Claims, 4 Drawing Sheets

(56) References Cited

U.S. PATENT DOCUMENTS

| | | |
|---|---|---|
| 2005/0219743 A1 | 10/2005 | Guan et al. |
| 2005/0264931 A1* | 12/2005 | McFadyen .................. 360/126 |
| 2007/0177301 A1 | 8/2007 | Han et al. |
| 2007/0217069 A1 | 9/2007 | Okada et al. |
| 2008/0239567 A1 | 10/2008 | Sasaki et al. |
| 2008/0316644 A1 | 12/2008 | Lee et al. |
| 2009/0168242 A1 | 7/2009 | Liu |
| 2009/0273863 A1 | 11/2009 | Kawano et al. |

* cited by examiner

US 8,734,894 B2

SELF-ALIGNED BEVELS FOR WRITE POLES

BACKGROUND

Data storage systems such as disc drives typically include one or more storage discs that are rotated by a spindle motor. The surface of each of the one or more storage discs is divided into a series of data track that are spaced radially from one another across a band having an inner diameter and an outer diameter. An interactive element, such as a magnetic transducer, is used to sense the magnetic transitions to read data from the given track. In addition, the interactive element can transmit an electric signal that causes a magnetic transition on the disc surface to write data to the given track.

The interactive element is mounted to an arm of an actuator. The interactive element is then selectively positioned by the actuator arm over a given data track of the disc to either read data from or write data to the given data track of the disc, as the disc rotates adjacent the transducer. The interactive element is positioned so that it hovers over the disc, supported by a volume of air between the interactive element and the disc.

As the areal density of a storage device increases, the width of each data track decreases, thereby allowing for more data tracks on the same overall area. Correspondingly, interactive elements that could formerly be positioned over a single data track when the data tracks were wider are now no longer capable of being positioned over a single data track without extending into area over neighboring tracks. In such cases, adjacent track interference may occur. Adjacent track interference can result in a write head inadvertently changing the data stored in neighboring tracks as a magnetic field intended for writing data on one track interferes with data previously stored on an adjacent track.

SUMMARY

In one illustrative embodiment, a method is discussed. The method includes milling a bevel into a portion of a surface of a base portion of a wafer. A first layer of material is deposited onto the beveled portion of the base portion so that a portion of the first layer forms a wedge shape above the surface of the base portion. A second layer of material is also deposited onto the base portion including the portion of the base portion onto which the first layer of material is deposited.

These and other features and benefits that characterize embodiments of the present invention will be apparent upon reading the following detailed description and review of the associated drawings.

DETAILED DESCRIPTION OF ILLUSTRATIVE EMBODIMENTS

Embodiments of the present discussion provided below refer to elements fabricated from layers of thin film material. One type of element discussed below that advantageously employs elements fabricated from layers of thin film material includes transducers of a read/write head that interact with a data storage device. One skilled in the art will recognize that the embodiments may also be applied to other types of elements, including, for example, sensors, magnetic stacks, integrated circuits, or other types of transducers and interactive elements.

Figure 1:
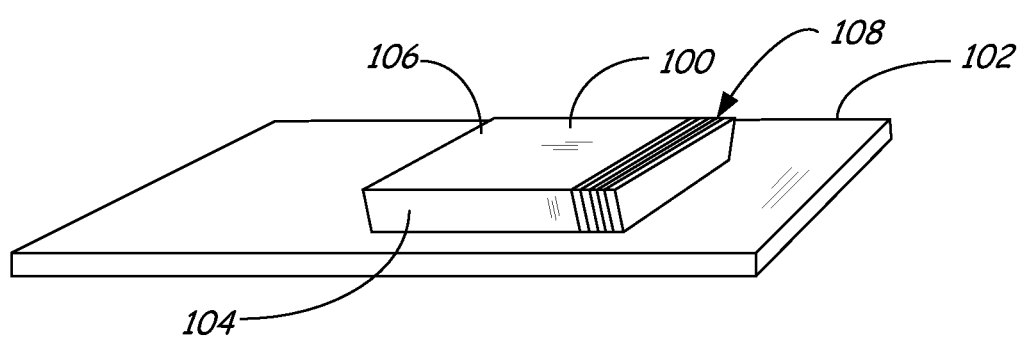
FIG. 1 is a schematic diagram providing a perspective illustration of the interactive element relative to a data storage device according to one illustrative embodiment.

FIG. 1 provides a schematic representation of the interactive element 100 in close proximity with a portion of a data storage device 102. FIG. 1 does not illustrate an actuator arm, but it should be appreciated that the interactive element 100 in some embodiments is advantageously attached to an actuator arm to position the interactive element 100 with respect to the storage device 102. One performance consideration for the interactive element 100 illustrated in FIG. 1 is that it should provide an appropriate magnetic field to read/write data from/to a particular track on the storage device 102 to which it is proximally located. In addition, the magnetic field of interactive element 100 preferably avoids interfering with data stored on tracks that are adjacent to the particular track with which it is interacting. Adjacent track interference can occur if the magnetic field provided by interactive element 100 is not properly focused within the width of a particular data, which can result in data read errors or accidental erasure of adjacent tracks can occur when writing to a particular track. As the interactive elements become narrower to accommodate storage devices having narrower data tracks, the overall size of the interactive element becomes smaller, which makes it increasingly difficult to provide a sufficient magnetic field to properly read from and/or write to a track. In addition, as an interactive element becomes narrower, wall angles 104 on the sides of interactive element 100 become increasingly steeper to shape the magnetic field provided by the interactive element 100 so as to avoid interfering with data that may be stored on adjacent tracks.

The interactive element 100 illustratively includes a substrate 106, upon which a stack 108 of layers are applied. In some embodiments, the stack 108 includes a write pole and/or a read pole for writing information to and reading information from the storage device 102, respectively. The interactive element 100 is not drawn to scale, but shows the thickness of the layers in the stack 108 enlarged for illustrative purposes.

Figure 2:
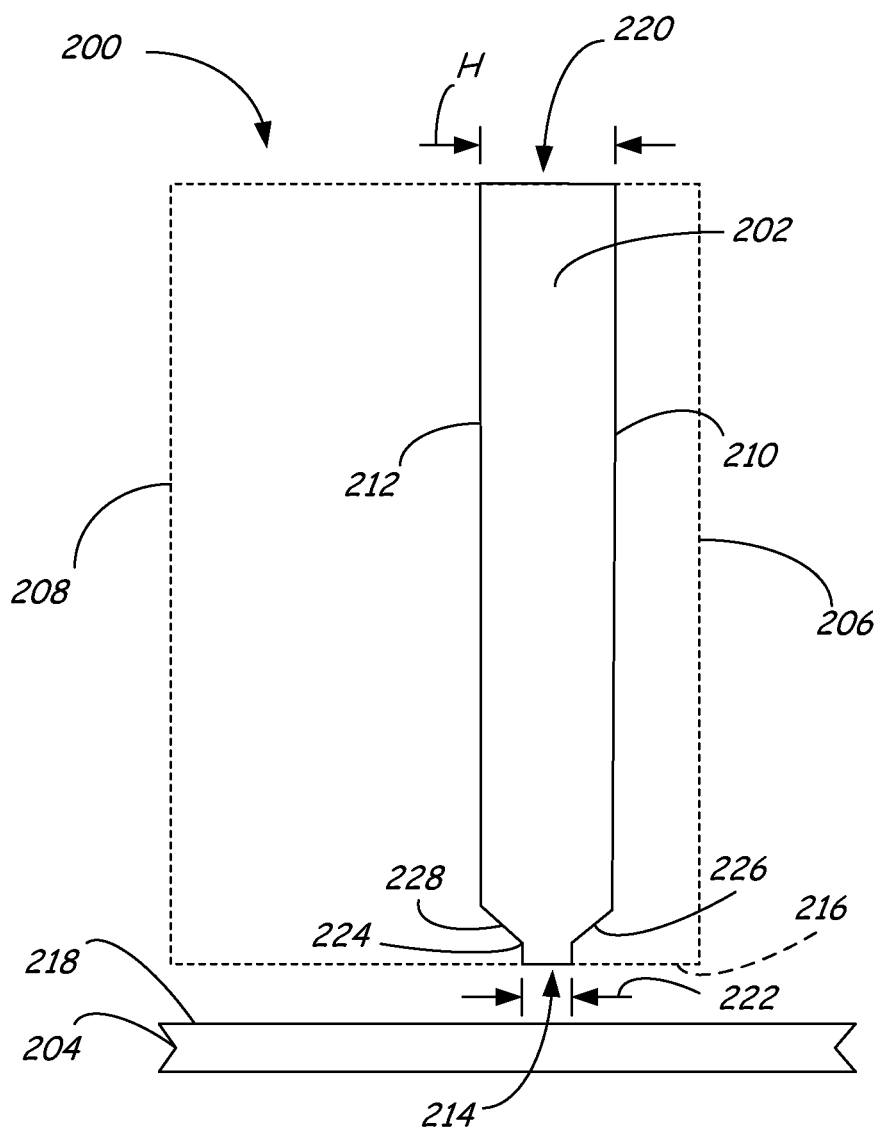
FIG. 2 illustrates a side view of a write pole of an interactive element of the type illustrated in FIG. 1 having beveled sides according to one illustrative embodiment.

FIG. 2 is a schematic illustration of a side view of an interactive element 200 with a write pole 202 according to one illustrative embodiment. Interactive element 200 is shown in dashed lines, except for the write pole 202, which is not drawn to scale so as to more easily illustrate various features of the write pole 202.

The interactive element 200 has a first edge 206 and a second edge 208, which opposes the first edge 206. Correspondingly, the write pole 202 has a first edge 210 and a second edge 212, which opposes the first edge 210. While the interactive element 200 has a different orientation with respect to the data storage device 204 than it does when it is being fabricated, for the purposes of this discussion, the distance between the first edge 210 and the second edge 212 is referred to as the height, H, of the write pole 202. The write pole 202 has a proximal end 214, which in some embodiments forms part of an air bearing surface 216 that faces a top surface 218 of the data storage device 204 and a distal end 220, which opposes the proximal end 214.

As is illustrated in FIG. 2, neither of the first edge 210 nor the second edge 212 are completely flat, most notably near the proximal end 214 of the write pole 202. Thus, the height of the write pole 202 is not constant from the proximal end 214 to the distal end 220. At the proximal end 214, the write pole 202 has a height that is referred to at the top pole height 222. The height of the write pole 202 illustratively remains at the top pole height 222 from the proximal end 214 to a break point 224. At the break point 224, the height of the write pole 202 increases as the first edge 210 and the second edge 212 taper away from each other until write pole 202 reaches an overall height H. Thus, the first edge 210 of the write pole 202 has a beveled portion 226 positioned behind, or away, from the air-bearing surface 216. Likewise, the second edge 212 of the write pole 202 has a beveled portion 228 similar in angular departure and distance from the air bearing surface 216 as beveled portion 226.

It has been found that shaping a write pole 202 with bevels such as bevels 226 and 228 located behind the air-bearing surface provides additional magnetic field by increasing the height of most of the write pole 202 as compared to a write pole without such bevels. In addition, by having a narrowed portion near the air-bearing surface 216, the magnetic field is focused sufficiently so as to avoid adjacent track interference. Therefore, it is advantageous for the bevels 226 and 228 to be positioned precisely so as to focus the magnetic field provided by the write pole in a desired location, that is, within a track over which the interactive element is positioned. By focussing the magnetic field within a track over which the interactive element is positioned, adjacent track interference will be greatly reduced or avoided.

Figure 3:
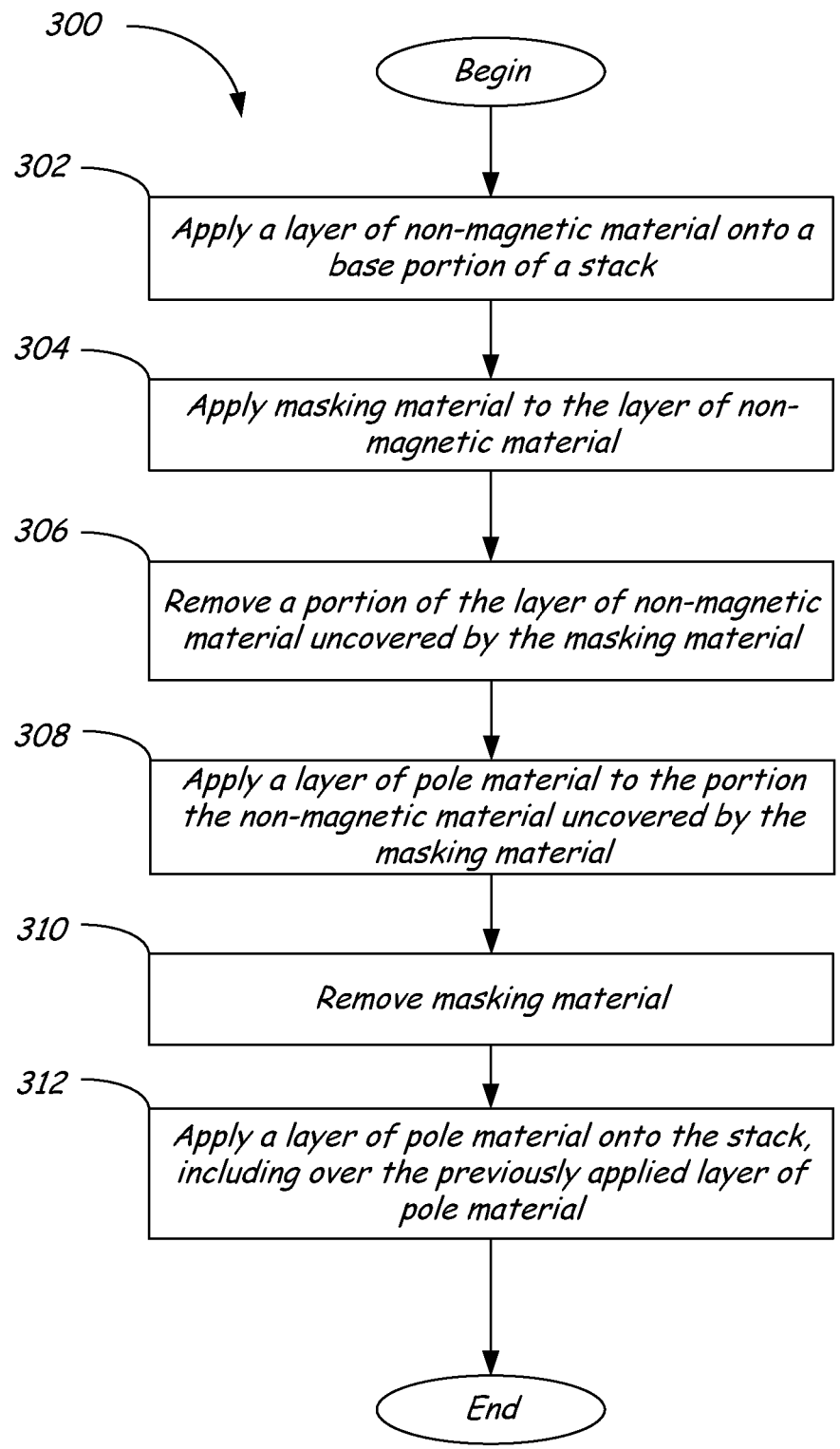
FIG. 3 is a flow chart illustrating a method of manufacturing the write pole illustrated in FIG. 2 according to one illustrative embodiment.
Figure 4:
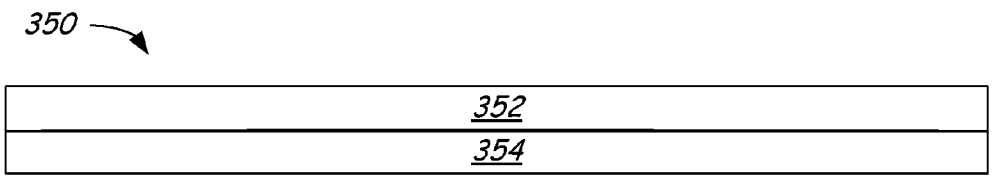
FIGS. 4-9 illustrate a portion of a wafer illustrating the manufacture of the write pole of FIG. 2 at various points during the manufacturing process illustrated in FIG. 3, according one illustrative embodiment.

FIG. 3 illustrates a method 300 for manufacturing a layer such as write pole 202 on a wafer by forming the write pole as a layer on a wafer according to one illustrative embodiment. FIGS. 4-9 illustrate a portion of a wafer 350 showing the application of write pole material at different points during the process. Method 300 includes the process of applying a layer 352 of non-magnetic material onto a substrate 354 of the wafer 350. This is illustrated at block 302 and in FIG. 4. The process of applying layer 352 can be accomplished using known techniques generally. The substrate 354, for the purposes of this discussion, includes a substrate material and any layers that might have been previously applied to the substrate. In one illustrative embodiment, the layer 352 is alumina (Al$_2$O$_3$), although other materials may be used. The layer 352 illustratively provides isolation between the write pole and any other layer of the interactive element that might have been previously applied to the wafer 350.

Figure 5:
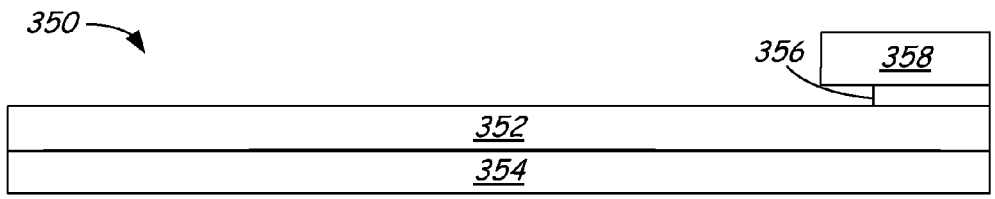

After the layer 352 of non-magnetic material is applied to the substrate 354, masking material is applied to the layer 352 of non-magnetic material. This is illustrated in block 304. In one illustrative embodiment, the process of applying masking material includes applying a first masking layer 356 and a second masking layer 358 as is illustrated in FIG. 5. The first masking layer 356 is illustratively made of polymethylglutarimide or other suitable material and is applied over a portion of the layer 352 of non-magnetic material. The second masking layer 358 is then applied onto the first masking layer 356. The second masking layer 358 is made from any acceptable photo resist material.

After the masking material is applied to layer 352 of non-magnetic material, a portion of the layer 352 of non-magnetic material not covered by the masking layers 356 and 358 is removed from the wafer 350 as is illustrated in block 306. In one illustrative embodiment, material is removed from the layer 352 of non-magnetic material so that it material corresponds to a boundary for the bottom surface of write pole 202.

Figure 6:
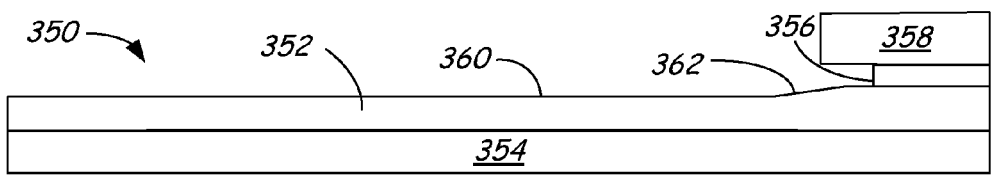

A surface 360, shown in FIG. 6, of the layer 352 after the removal of material includes an angular portion 362 that corresponds to an angle on a bevel on the bottom of the write pole 202. The removal of material from the layer 352 of non-magnetic material is accomplished, in one embodiment, by milling the material away.

Figure 7:
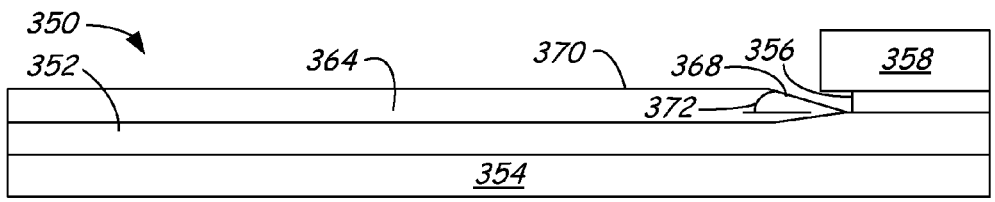
Figure 7:

After the layer 352 has been reshaped through the removal of material, a layer 364 of pole material is applied to the surface 360 of layer 352, as is illustrated in block 308 and FIG. 7. In one illustrative embodiment, the material for layer 364 is applied by an additive process such as sputtering while the wafer 350 is rotating in a direction illustrated by arrow 366. In addition, the application tool is positioned at angle with respect to the wafer 350 so that masking layers 356 and 358 provide a shadowing effect. Because of the shadowing effect, the layer 364 includes an angular portion 368 on a top surface 370 of the layer 364. As will be discussed below, the angular portion 368 of the top surface 370 has an angle 372 that is the same as the desired angle of a top bevel for the write pole 202.

Figure 8:
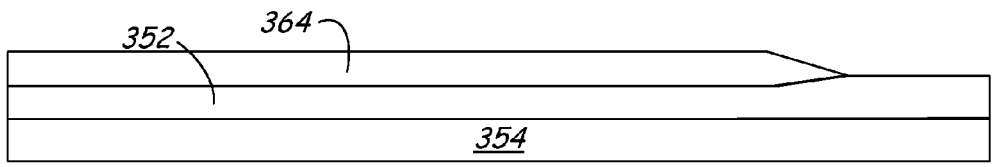
Figure 9:
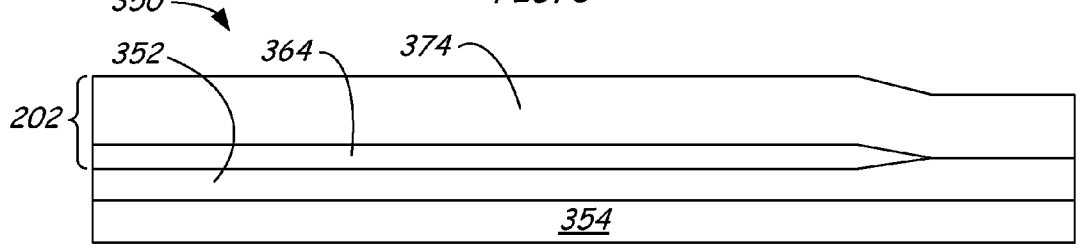

Once the layer 364 is applied to the wafer 350, the masking layers 356 and 358 are removed from the wafer 350 as is illustrated in block 310 and FIG. 8. Then, a layer 374 of pole material is applied onto the wafer 350, including on the portion of the wafer 350 that includes the layer 364. This is illustrated in block 312 and FIG. 9. The layer 374 has a generally uniform thickness, but because the layer 364 has a wedge-shaped portion the layer 374 correspondingly has a wedge that corresponds to the wedge-shaped portion of layer 364 and thus, the two wedge shaped portions are self-aligned, that is, they are aligned through the manufacturing process without any particular steps taken to align them. The combination of the layer 374 and the layer 364 comprise the write pole 202. Once the wafer is completed, interactive elements are cut out of the wafer and the interactive element is rotated 90 degrees and is attached to an actuator arm. Thus, an edge of the interactive element such as edge 306 forms an air-bearing surface of an interactive element when it is attached to an actuator arm.

The embodiments discussed above provide several advantages. For example, the embodiments enhance the magnetic field provided by the interactive element, reduce the transition curvature by enhancing the field at the corner of the poles via the narrowed shape of the write pole accomplished by employing the wedged-shaped portions of layers 364 and 374, and reduce adjacent track interference, by focusing the magnetic field over the track with which the element interacts. All of these advantages lead to improved areal density capability. In addition, by accomplishing self-alignment of the wedge shaped portions of the write pole, manufacturing of the write pole is efficiently accomplished.

It is to be understood that even though numerous characteristics and advantages of the various embodiments have been set forth in the foregoing description, together with details of the structure and function of various embodiments, this disclosure is illustrative only, and changes may be made in detail, especially in matters of structure and arrangement of parts within the principles of the present embodiments to the full extent indicated by the broad general meaning of the terms in which the appended claims are expressed.

What is claimed is:

1. A method of forming a write pole, comprising:
applying a layer of non-conductive material onto a surface of a wafer;
forming a bevel by removing a portion of the layer of non-conductive material;

depositing a first layer of conductive material onto the beveled portion of the layer of non-conductive material so that part of the first layer of conductive material includes a wedge shape above a surface of the layer of non-conductive material, wherein the wedge includes a first inclined surface and a second inclined surface that is opposite the first inclined surface, and wherein the first inclined surface of the wedge and the second inclined surface of the wedge meet at a junction; and depositing a second layer of conductive material onto the layer of non-conductive material including the portion of the layer of non-conductive material onto which the first layer of conductive material is deposited.

2. The method of claim 1, wherein removing the portion of the layer of non-conductive material is accomplished by milling material from the layer of non-conductive material.

3. The method of claim 1 and further comprising:
applying masking material onto the layer of non-conductive material prior to applying the first layer of conductive material.

4. The method of claim 3 and further comprising:
removing the masking material prior to applying the second layer of conductive material.

5. The method of claim 3 wherein applying masking material includes applying a first masking material onto the layer of non-conductive material and a second masking material onto the first masking material.

6. The method of claim 3 and further comprising:
causing the wafer to rotate while applying the first layer of conductive material.

7. The method of claim 6, wherein the first layer of conductive material is sputtered onto the layer of non-conductive material using an applicator and further comprising:
positioning the applicator at an angle with respect to the wafer so that the masking material interferes with the application of the first layer over a portion of the layer of non-conductive material not directly covered by the masking material.

8. The method of claim 1, wherein depositing the second layer of conductive material onto the layer of non-conductive material including the portion of the layer of non-conductive material onto which the first layer of conductive material is deposited includes depositing a layer having a generally uniform thickness over the wafer.

9. A method of forming a write pole, comprising:
applying a layer of non-conductive material onto a surface of a wafer;
forming a bevel by removing a portion of the layer of non-conductive material;
applying a first layer of a conductive material onto the layer of non-conductive material including the bevel so that a portion of the first layer has inclined first and second opposing surfaces, wherein the first inclined surface and the second inclined surface meet at a junction; and applying a second layer of the conductive material having a generally uniform thickness onto the first layer.

10. The method of claim 9 and further comprising:
applying masking material onto the layer of non-conductive material prior to applying the first layer of conductive material.

11. The method of claim 10, wherein applying masking material includes applying a first layer of masking material onto the layer of non-conductive material and applying a second layer of masking material onto the first layer of masking material.

12. The method of claim 11, wherein applying the first layer of masking material includes applying material so that a portion of the first layer of masking material is applied beneath the second layer of masking material.

13. The method of claim 11 and further comprising:
sputtering the first layer of conductive material onto the layer of non-conductive material with an applicator positioned at an angle with respect to the wafer so that the masking material interferes with the application of the first layer of conductive material over a portion of the layer of non-conductive material not directly covered by the masking material.

14. A method of forming a write pole, comprising:
applying a layer of non-conductive material onto a surface of a wafer;
forming a bevel by removing a portion of the layer of non-conductive material;
applying masking material onto a surface of the layer of non-conductive material so that a portion of the masking material is suspended over the bevel;
applying a first conductive layer of material onto the surface of the layer of non-conductive material, including over all of the bevel formed into the layer of non-conductive material; and
applying a second conductive layer of material onto the first conductive layer.

15. The method of claim 14, wherein the first conductive layer of material has a first surface adjacent the layer of non-conductive material and a second surface opposing the first surface and where the first conductive layer is applied so that second surface has angled departure from the layer of non-conductive material along the bevel.

16. The method of claim 14, wherein the second conductive layer of material is applied so that it has a generally uniform thickness over the first conductive layer.

17. The method of claim 14 and further comprising:
removing the masking material before applying the second conductive layer of material and wherein the second conductive layer of material is applied at a generally uniform thickness over portions of the layer of non-conductive material uncovered by the first conductive layer.

* * * * *